Feb. 28, 1956     H. D. UMSTOTT     2,736,211
DETACHABLE AUXILIARY STEERING WHEEL FOR MOTOR VEHICLES
Filed July 9, 1953
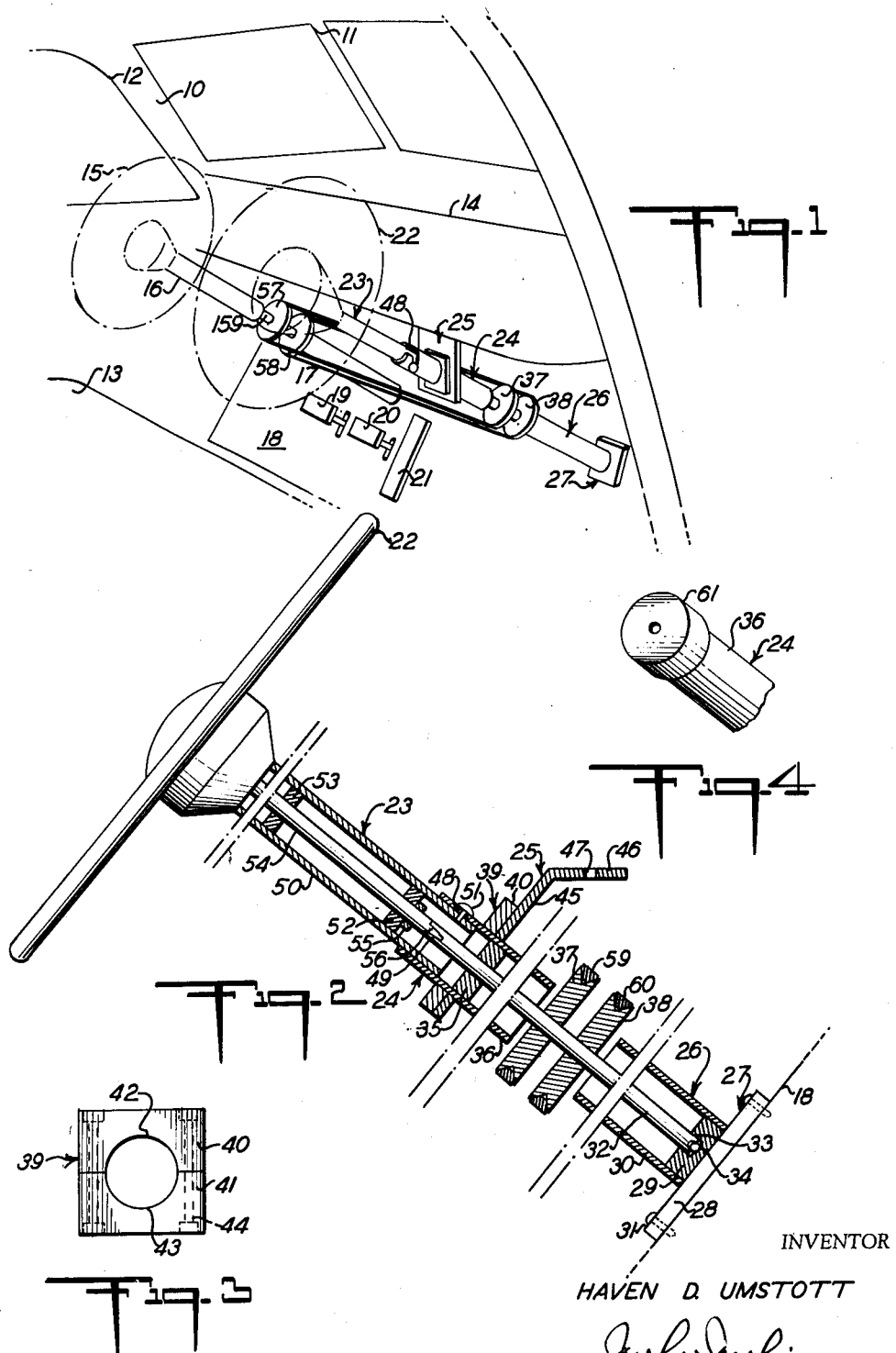
INVENTOR
HAVEN D. UMSTOTT
BY
ATTORNEYS

United States Patent Office 2,736,211
Patented Feb. 28, 1956

2,736,211

DETACHABLE AUXILIARY STEERING WHEEL FOR MOTOR VEHICLES

Haven D. Umstott, Arlington, Va.

Application July 9, 1953, Serial No. 366,896

7 Claims. (Cl. 74—494)

This invention relates to transportation and more particularly to a detachable auxiliary steering wheel for motor vehicles. It is contemplated that this auxiliary steering wheel will be utilized for motor vehicle driver instruction or in any vehicle where it might be desired to change drivers without the necessity for changing the seating location of the driver.

Heretofore various types of auxiliary steering wheels for motor vehicles have been developed and utilized but many of these required extensive modification of the vehicle to permit installation thereof which modification often involved changing the steering linkage system which frequently resulted in binding at each end of the travel of such linkage and in non-uniform operation thereof.

Furthermore, these prior art auxiliary steering wheels were not universally adaptable to various makes and models of cars but were required to be manufactured for each specific model and to be either installed at the factory during the assembly of the automobile or be installed in a shop possessing sufficient tools and machinery and skilled personnel for making the extensive modifications necessary when installing the apparatus.

It is therefore an object of the invention to provide a detachable auxiliary steering wheel for motor vehicles which steering wheel may be removed and replaced without in any way interfering with the normal operation of the conventional steering wheel and associated mechanism installed in the vehicle.

A further object of the invention is the provision of a detachable auxiliary steering wheel for motor vehicles which may be conveniently and quickly installed in new or existing motor vehicles without an any way modifying or altering the existing steering linkages and joints.

A still further object of the invention is the provision of a detachable auxiliary steering wheel for motor vehicles which may be conveniently installed in existing vehicles without the necessity of cutting or forming relatively large holes in the dash, floor board, or fire wall.

Another object of the invention is the provision of a detachable auxiliary steering wheel for motor vehicles in which the steering wheel and a portion of the steering column may be removed and replaced without requiring the use of tools and in which substantially all play and backlash is eliminated.

A further object of the invention is the provision of a detachable auxiliary steering wheel for motor vehicles which utilizes the conventional existing steering mechanism for transmitting steering power to the front wheels of the vehicle and in which the torque required for steering is the same regardless of whether the auxiliary wheel or the conventional wheel is being utilized.

A still further object of the invention is the provision of a detachable auxiliary steering wheel for motor vehicles which may be economically constructed of readily available parts and materials and which may be manufactured and installed by relatively unskilled labor.

Further objects and advantages of the invention will be apparent from the following description taken in conjunction with the accompanying drawings wherein:

Fig. 1 is a perspective view of the driving compartment of a motor vehicle and showing the detachable auxiliary steering wheel of this invention installed therein;

Fig. 2, a longitudinal sectional view showing the internal structure of the detachable auxiliary steering wheel shown in Fig. 1;

Fig. 3, a front elevational detail view showing the clamping block utilized to secure the intermediate steering column to the supporting bracket; and Fig. 4, a fragmentary perspective view showing the upper end of the intermediate steering column with the detachable wheel removed and a detachable cap covering the upper end of the intermediate steering column.

With continued reference to the drawing there is shown in Fig. 1 a motor vehicle having the conventional corner posts 10, a windshield 11, door 12, seat 13, and dash or instrument panel 14. A conventional steering wheel 15 is installed at the upper end of a steering column 16, the lower end 17 of which passes through an aperture in the floor board 18 and is connected to the conventional steering linkages and associated mechanism. Also installed in the normal driver side of the driver compartment is a clutch pedal 19, a brake pedal 20, and an accelerator pedal 21.

The detachable auxiliary steering wheel of this invention is installed in the right hand side of the driver's compartment and may well include a steering wheel 22, an upper steering column 23, an intermediate steering column 24, a bracket 25 for securing the intermediate steering column 24 to the dash 14, and a lower steering column 26. The lower steering column 26 may be supported and secured to the floor board 18 of the vehicle by a foot plate 27.

With particular reference to Fig. 2 the foot plate 27 may well comprise a rectangular or other suitably shaped plate 28 provided with a bearing 29, the external diameter of which is such as to snugly receive a tubular member 30 forming a portion of lower steering column 26. The plate 28 may be secured to the floor board 18 by any convenient means such as screw threaded fastening means or the like 31.

A lower steering shaft 32 may be received within the tubular member 30 and may be journalled for rotation in a recess 33 in the bearing 29. Also located within the recess 33 may be a ball 34 or other suitable thrust bearing means which engages and supports the lower steering shaft 32 to permit rotation of the same with a minimum of frictional resistance. The lower steering shaft 32 adjacent its upper end is journalled in a bearing 35 fixed in a tubular member 36 forming the intermediate steering column 24. Fixed to the lower steering shaft 32 between the lower end of tubular member 36 and the upper end of tubular member 30 are a pair of V-pulleys or other suitable power transmission means 37 and 38.

The intermediate steering column 24 extends through and is secured to the bracket 25 by means of a clamping block 39 which as shown in Fig. 3 may comprise a fixed part 40 and a removable part 41. Fixed part 40 may be secured to the bracket 25 by any suitable means such as welding or the like and is provided with a semi-circular recess 42 for receiving the tubular member 36 forming the intermediate steering column 24. The removable portion 41 of the clamping block 39 may be provided with a semi-circular recess 43 complementary to the recess 42 and the removable portion 41 may be detachably secured to the fixed portion 40 by screw threaded fastening means or the like 44 extending through removable portion 41 and into fixed portion 40. Tightening of the screw threaded fastening means 44 serves to firmly clamp the intermediate steering column 24 to the bracket 25 by engagement of the surfaces of the semi-circular recesses 42 and 43 with the external surface of the tubular member 36. The bracket 25 may well include a portion 45 to which the fixed portion 40 of the clamping block 39 is secured and an angularly disposed portion 46 provided with one or more apertures 47 therein to permit convenient attachment of the bracket 25 to the dash 14 of the motor vehicle.

The tubular member 36 of the intermediate steering column 24 is provided with a bayonet slot 48, the purpose of which will be presently described and the upper end of the lower steering shaft 32 is provided with a transverse V-shaped groove 49.

The upper steering column 23 may well include a tubular member 50 which may be snugly and slidably received within the upper end of tubular member 36 forming the intermediate steering column 24. The tubular member 50 is provided adjacent its lower end with a pin, rivet or stud 51 which is received in the bayonet slot 48 when the tubular member 50 is inserted in the tubular member 36 to securely lock the two tubular members in operative position.

Journalled within the tubular member 50 in bearings 52 and 53 is an upper steering shaft 54 which is fixed at its upper end to the steering wheel 22 and which is secured against endwise movement in the tubular member 50 by a collar 55 fixed to the shaft 54 and engaging the lower surface of bearing 52. The lower end of upper steering shaft 54 is provided with a V-shaped projection 56 which is complementary to the V-shaped groove 49 in the upper end of lower steering shaft 32 and interengagement of this groove and projection serves to firmly couple upper shaft 54 to lower shaft 32 thus eliminating all play or backlash therebetween.

V-pulleys or other suitable power transmission means 57 and 58 are secured to the steering shaft 159 which is fixed to the conventional steering wheel 15, a portion of the steering column 16 being removed to accommodate these pulleys.

The detachable auxiliary steering wheel of this invention is installed in the motor vehicle by securing the foot plate 27 to the floor board 18 in the proper location and by securing the bracket 25 to the dash 14 so that the lower steering column 26, intermediate steering column 24 and upper steering column 23 will be in alignment. The auxiliary steering wheel is connected to the conventional steering wheel and associated mechanism by V-belts or other suitable power transmission means 59 and 60, belt 59 passing over pulleys 37 and 57 and belt 60 passing over pulleys 38 and 58. By this arrangement it will be seen that upon rotation of auxiliary steering wheel 22 the conventional steering wheel 15, steering shaft 159 and associated mechanism will be actuated to steer the vehicle, and since this arrangement requires no alteration or modification of the conventional steering mechanism no change will be experienced in the effort required to steer the vehicle or in the feel experience by the driver.

For purposes of driver instruction or when for any other reason it is desired to permit a change of driver without the changing of seat positions the auxiliary steering wheel will be installed as shown in Fig. 1 but should it be desired to utilize the vehicle with conventional drive and without the presence of the auxiliary steering wheel it is only necessary to grasp and rotate the upper steering column 23 to disengage the pin 51 from the bayonet slot 48 whereupon the upper steering column 23 and steering wheel 22 may be removed from the intermediate steering column 24, the V-shaped projection 56 being of course disengaged from the V-shaped groove 49 during this operation.

Since the open upper end of the tubular member 36 forming the intermediate steering column 24 would present an unsightly appearance and further since it is desirable to prevent the entry of dirt or other foreign matter into the tubular member 36 a removable cap 61 is provided which will tightly fit the upper end of the tubular member 36 until such time as it is desired to replace the upper steering column 23 and auxiliary steering wheel 22. This operation is, of course, accomplished by removing the cap 61 inserting the tubular member 50 within the tubular member 36 with the V-shaped projection 56 engaging the V-shaped groove 49 and with the pin 51 engaging the bayonet slot 48.

In a normal installation the two steering columns slightly diverge toward the rear of the vehicle and consequently the belts or other power transmission means 59 and 60 will be of slightly different lengths and therefore not interchangeable. This angularity will tend to increase the friction between the belts 59 and 60 and the pulleys and two belts are provided in order to transmit power between one steering shaft and the other thus affording a safety factor since even though one belt may break, the other would continue to transmit power.

If desired auxiliary controls including a clutch pedal 62, brake pedal 63, and accelerator pedal 64 may be installed but since these controls form no part of this invention further description is considered unnecessary.

It will be seen that by the above described invention there has been provided a detachable auxiliary steering wheel for motor vehicles which may be conveniently installed either in new or existing vehicles with substantially no alteration or modification thereof and in which the auxiliary steering wheel may be conveniently removed or attached at will. This auxiliary steering wheel is a true duplicate of the conventional steering wheel and provides the same feel and requires the same steering effort. Consequently, the same is particularly useful for driver instruction but of course may be utilized whenever auxiliary equipment of this nature is desired.

Whereas belts and pulleys are shown and described it will be understood that other forms of power transmission suitable and adaptable to the structure may be utilized.

It will be obvious to those skilled in the art that various changes may be made in the invention without departing from the spirit and scope thereof and therefore the invention is not limited by that which is shown in the drawings and described in the specification but only as indicated in the appended claims.

What is claimed is:

1. A detachable auxiliary steering wheel for vehicles comprising a lower column including a tubular member secured to a foot plate, means for attaching said foot plate to the floor board of a vehicle, a thrust bearing carried by said foot plate within said tubular member, a lower steering shaft journalled in said thrust bearing and extending upwardly through said tubular member, an intermediate column including a second tubular member, a bearing in said second tubular member rotatably receiving said lower steering shaft, a pair of pulleys fixed to said lower steering shaft between the upper end of said tubular member and the lower end of said second tubular member, a V-shaped slot in the upper end of said lower steering shaft, means for supporting said intermediate column from the dash of the vehicle comprising a bracket, a clamping block having one portion secured to said bracket and a removable portion for engaging and securing said intermediate column to said bracket, a bayonet slot in the upper end of said second tubular member, an upper column including a third tubular member having a tight sliding fit in the upper end of said second tubular member, an upper steering shaft journalled for rotation in said third tubular member, a steering wheel fixed to the upper end of said upper steering shaft, a V-shaped projection on the lower end of said upper steering shaft, a pin on said third tubular member engaging in said bayonet slot for detachably securing said upper column to said intermediate column with said V-shaped projection in engagement with said V-shaped slot and flexible power transmission means for connecting said pulleys and the conventional steering mechanism on said vehicle.

2. A detachable auxiliary steering wheel for vehicles comprising a lower column including a tubular member secured to a foot plate, means for attaching said foot plate to the floor board of a vehicle, a thrust bearing carried by said foot plate within said tubular member, a lower steering shaft journalled in said thrust bearing and extending upwardly through said tubular member, an intermediate column including a second tubular member, a bearing in said second tubular member rotatably receiving said lower steering shaft, a V-shaped slot in the upper end of said lower steering shaft, means for supporting said intermediate column from the dash of the vehicle comprising a bracket, a clamping block having one portion secured to said bracket and a removable portion for engaging and securing said intermediate column to said bracket, a bayonet slot in the upper end of said second tubular member, an upper column including a third tubular member having a tight sliding fit in the upper end of said second tubular member, an upper steering shaft journalled for rotation in said third tubular member, a steering wheel fixed to the upper end of said upper steering shaft, a V-shaped projection on the lower end of said upper steering shaft, a pin on said third tubular member engaging in said bayonet slot for detachably securing said upper column to said intermediate column with said V-shaaped projection in engagement with said V-shaped slot and flexible power transmission means for connecting said lower steering shaft and the conventional steering mechanism on said vehicle.

3. A detachable auxiliary steering wheel for vehicles comprising a lower column including a tubular member secured to a foot plate, means for attaching said foot plate to the floor board of a vehicle, a thrust bearing carried by said foot plate within said tubular member, a lower steering shaft journalled in said thrust bearing and extending upwardly through said tubular member, an intermediate column including a second tubular member, a bearing in said second tubular member rotatably receiving said lower steering shaft, a slot in the upper end of said lower steering shaft, means for supporting said intermediate column from the dash to the vehicle comprising a bracket, a clamping block having one portion secured to said bracket and a removable portion for engaging and securing said intermediate column to said bracket, a bayonet slot in the upper end of said second tubular member, an upper column including a third tubular member having a tight sliding fit in the upper end of said second tubular member, an upper steering shaft journalled for rotation in said third tubular member, a steering wheel fixed to the upper end of said upper steering shaft, a projection on the lower end of said upper steering shaft, a pin on said third tubular member engaging in said bayonet slot for detachably securing said upper column to said intermediate column with said projection in engagement with said slot and flexible power transmission means for connecting said lower steering shaft and the conventional steering mechanism on said vehicle.

4. A detachable auxiliary steering wheel for vehicles comprising a lower column including a tubular member secured to a foot plate, means for attaching said foot plate to the floor board of a vehicle, a thrust bearing carried by said foot plate, a lower steering shaft journalled in said thrust bearing and extending upwardly through said tubular member, an intermediate column including a second tubular member, a bearing in said second tubular member rotatably receiving said lower steering shaft, a slot in the upper end of said lower steering shaft, means for supporting said intermediate column from the dash of the vehicle comprising a bracket, a bayonet slot in the upper end of said second tubular member, an upper column including a third tubular member having a tight sliding fit in the upper end of said second tubular member, an upper steering shaft journalled for rotation in said third tubular member, a steering wheel fixed to the upper end of said upper steering shaft, a projection on the lower end of said upper steering shaft, a pin on said third tubular member engaging in said bayonet slot for detachably securing said upper column to said intermediate column with said projection in engagement with said slot and power transmission means for connecting said lower steering shaft and the conventional steering mechanism on said vehicle.

5. A detachable auxiliary steering wheel for vehicles comprising a lower column including a tubular member secured to a foot plate, means for attaching said foot plate to the floor board of a vehicle, a thrust bearing carried by said foot plate, a lower steering shaft journalled in said thrust bearing and extending upwardly through said tubular member, an intermediate column including a second tubular member, a bearing in said second tubular member rotatably receiving said lower steering shaft, a slot in the upper end of said lower steering shaft, means for supporting said intermediate column from the dash of the vehicle, a bayonet slot in the upper end of said second tubular member, an upper column including a third tubular member having a tight sliding fit in the upper end of said second tubular member, an upper steering shaft journalled for rotation in said third tubular member, a steering wheel fixed to the upper end of said upper steering shaft, a projection on the lower end of said upper steering shaft, a pin on said third tubular member engaging in said bayonet slot for detachably securing said upper column to said intermediate column with said projection in engagement with said slot and power transmission means for connecting said lower steering shaft and the conventional steering mechanism on said vehicle.

6. A detachable auxiliary steering wheel for vehicles comprising a lower column including a tubular member secured to a foot plate, means for attaching said foot plate to a vehicle, a bearing carried by said foot plate, a lower steering shaft journalled in said bearing and extending upwardly through said tubular member, an intermediate column including a second tubular member, a bearing in said second tubular member rotatably receiving said lower steering shaft, a slot in the upper end of said lower steering shaft, means for supporting said intermediate column from the dash of the vehicle, an upper column including a third tubular member having a tight sliding fit in the upper end of said second tubular member, an upper steering shaft journalled for rotation in said third tubular member, a steering wheel fixed to the upper end of said upper steering shaft, a projection on the lower end of said upper steering shaft, means for detachably securing said upper column to said intermediate column with said projection in engagement with said slot and power transmission means for connecting said lower steering shaft and the conventional steering mechanism on said vehicle.

7. A detachable auxiliary steering wheel for vehicles comprising a lower column including a tubular member secured to a foot plate, means for attaching said foot plate to a vehicle, a bearing carried by said foot plate, a lower steering shaft journalled in said bearing and extending upwardly through said tubular member, an intermediate column including a second tubular member, a bearing in said second tubular member rotatably receiving said lower steering shaft, means for supporting said intermediate column from the dash of the vehicle, an upper column including a third tubular member having a tight sliding fit in the upper end of said second tubular member, an upper steering shaft journalled for rotation in said third tubular member, a steering wheel fixed to the upper end of said upper steering shaft, means for detachably coupling said upper steering shaft to said lower steering shaft, means for detachably securing said upper column to said intermediate column, and power transmission means for connecting said lower steering shaft and the conventional steering mechanism on said vehicle.

References Cited in the file of this patent

UNITED STATES PATENTS

| 778,627 | Bogart | Dec. 27, 1904 |
| 1,932,315 | Klock | Oct. 24, 1933 |
| 2,214,163 | De Frees | Sept. 10, 1940 |
| 2,544,635 | Ostrow | Mar. 6, 1951 |
| 2,584,636 | Sprinkel et al. | Feb. 5, 1952 |